(12) United States Patent
Vutukuru et al.

(10) Patent No.: US 12,189,465 B2
(45) Date of Patent: Jan. 7, 2025

(54) MACHINE-LEARNING BASED SIMILARITY ENGINE

(71) Applicant: ServiceNow, Inc., Santa Clara, CA (US)

(72) Inventors: Hari Krishna Vutukuru, Hyderabad (IN); Purvanshi Yadav, Hyderabad (IN); Anushree Randad, Santa Clara, CA (US); Ajesh Sasidharan, Hyderabad (IN); Payal Roy, Hyderabad (IN); Ankit Kumar Das, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 18/594,906

(22) Filed: Mar. 4, 2024

(65) Prior Publication Data

US 2024/0202061 A1    Jun. 20, 2024

Related U.S. Application Data

(63) Continuation of application No. 18/120,011, filed on Mar. 10, 2023, now Pat. No. 11,953,977, which is a
(Continued)

(51) Int. Cl.
    *G06F 11/00*        (2006.01)
    *G06F 11/07*        (2006.01)
    *G06N 20/00*        (2019.01)
(52) U.S. Cl.
    CPC ...... *G06F 11/0787* (2013.01); *G06F 11/0769* (2013.01); *G06N 20/00* (2019.01)
(58) Field of Classification Search
    CPC .................................................. G06F 11/0787
    (Continued)

(56) References Cited

U.S. PATENT DOCUMENTS 4,941,084 A    7/1990   Terada
5,185,860 A    2/1993   Wu
(Continued)

FOREIGN PATENT DOCUMENTS

EP    0433979 A2    6/1991
EP    1607824 A2    12/2005
(Continued)

OTHER PUBLICATIONS

U.S. Appl. No. 16/135,793, filed Sep. 19, 2018.
U.S. Appl. No. 16/434,888, filed Jun. 7, 2019.
U.S. Appl. No. 16/362,187, filed Mar. 22, 2019.

*Primary Examiner* — Sarai E Butler
(74) *Attorney, Agent, or Firm* — McDonnell Boehenn Hulbert & Berghoff LLP

(57) ABSTRACT

An embodiment may involve storage containing incident logs and mappings between incident logs and vector representations generated by a machine learning (ML) model. The embodiment may further involve one or more processors configured to: receive, from a client device, a classification request corresponding to an additional incident log; transmit, to the ML model, additional values as appearing in the additional incident log, wherein reception of the additional values causes the ML model to generate an additional vector representation of the additional incident log; obtain confidence measurements respectively representing similarities between the additional vector representation and each of the vector representations corresponding to the incident logs; determine, based on the confidence measurements, a set of one or more incident logs that are semantically relevant to the additional incident log; and transmit, to the client device, representations of the one or more incident logs and their corresponding confidence measurements.

20 Claims, 17 Drawing Sheets

Related U.S. Application Data continuation of application No. 17/142,769, filed on Jan. 6, 2021, now Pat. No. 11,630,717.

(58) Field of Classification Search
USPC ...................................................... 714/1–57
See application file for complete search history.

(56) References Cited

U.S. PATENT DOCUMENTS

| | | |
|---|---|---|
| 5,237,518 A | 8/1993 | Sztipanovits |
| 5,261,097 A | 11/1993 | Saxon |
| 5,265,252 A | 11/1993 | Rawson, III |
| 5,367,685 A | 11/1994 | Gosling |
| 5,390,297 A | 2/1995 | Barber |
| 5,442,791 A | 8/1995 | Wrabetz |
| 5,452,415 A | 9/1995 | Hotka |
| 5,522,042 A | 5/1996 | Fee |
| 5,533,116 A | 7/1996 | Vesterinen |
| 5,655,081 A | 8/1997 | Bonnell |
| 5,659,736 A | 8/1997 | Hasegawa |
| 5,671,412 A | 9/1997 | Christiano |
| 5,696,701 A | 12/1997 | Burgess |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke |
| 5,887,139 A | 3/1999 | Madison, Jr. |
| 5,909,217 A | 6/1999 | Bereiter |
| 5,937,165 A | 8/1999 | Schwaller |
| 5,949,976 A | 9/1999 | Chappelle |
| 5,978,594 A | 11/1999 | Bonnell |
| 6,021,437 A | 2/2000 | Chen |
| 6,041,347 A | 3/2000 | Harsham |
| 6,088,717 A | 7/2000 | Reed |
| 6,101,500 A | 8/2000 | Lau |
| 6,128,016 A | 10/2000 | Coelho |
| 6,131,118 A | 10/2000 | Stupek, Jr. |
| 6,134,581 A | 10/2000 | Ismael |
| 6,138,122 A | 10/2000 | Smith |
| 6,148,335 A | 11/2000 | Haggard |
| 6,166,732 A | 12/2000 | Mitchell |
| 6,167,448 A | 12/2000 | Hemphill |
| 6,175,866 B1 | 1/2001 | Holloway et al. |
| 6,175,878 B1 | 1/2001 | Seaman |
| 6,260,050 B1 | 7/2001 | Yost |
| 6,263,457 B1 | 7/2001 | Anderson |
| 6,272,150 B1 | 8/2001 | Hrastar |
| 6,336,138 B1 | 1/2002 | Caswell |
| 6,363,421 B2 | 3/2002 | Barker |
| 6,393,386 B1 | 5/2002 | Zager |
| 6,397,245 B1 | 5/2002 | Johnson, II |
| 6,434,626 B1 | 8/2002 | Prakash |
| 6,438,592 B1 | 8/2002 | Killian |
| 6,456,306 B1 | 9/2002 | Chin |
| 6,466,932 B1 | 10/2002 | Dennis |
| 6,487,590 B1 | 11/2002 | Foley |
| 6,505,248 B1 | 1/2003 | Casper |
| 6,526,442 B1 | 2/2003 | Stupek, Jr. |
| 6,621,823 B1 | 9/2003 | Mellquist |
| 6,707,795 B1 | 3/2004 | Noorhosseini |
| 6,742,015 B1 | 5/2004 | Bowman-Amuah |
| 6,763,380 B1 | 7/2004 | Mayton |
| 6,816,898 B1 | 11/2004 | Scarpelli |
| 6,895,586 B1 | 5/2005 | Brasher |
| 6,948,175 B1 | 9/2005 | Fong |
| 6,985,901 B1 | 1/2006 | Sachse |
| 7,003,564 B2 | 2/2006 | Greuel |
| 7,028,228 B1 | 4/2006 | Lovy |
| 7,043,537 B1 | 5/2006 | Pratt |
| 7,043,661 B2 | 5/2006 | Valadarsky |
| 7,062,683 B2 | 6/2006 | Warpenburg |
| 7,096,459 B2 | 8/2006 | Keller |
| 7,146,574 B2 | 12/2006 | Goldthwaite |
| 7,197,466 B1 | 3/2007 | Peterson |
| 7,215,360 B2 | 5/2007 | Gupta |
| 7,216,304 B1 | 5/2007 | Gourdol |
| 7,222,147 B1 | 5/2007 | Black |
| 7,281,170 B2 | 10/2007 | Taylor |
| 7,412,502 B2 | 8/2008 | Fearn |
| 7,505,872 B2 | 3/2009 | Keller |
| 7,593,013 B2 | 9/2009 | Agutter |
| 7,596,716 B2 | 9/2009 | Frost |
| 7,617,073 B2 | 11/2009 | Trinon |
| 7,660,731 B2 | 2/2010 | Chaddha |
| 7,676,294 B2 | 3/2010 | Baier |
| 7,676,437 B2 | 3/2010 | Satkunanathan |
| 7,840,490 B1 | 11/2010 | Sellers |
| 7,877,783 B1 | 1/2011 | Cline |
| 7,890,869 B1 | 2/2011 | Mayer |
| 7,966,398 B2 | 6/2011 | Wiles, Jr. |
| 8,060,396 B1 | 11/2011 | Bessler |
| 8,166,348 B1 | 4/2012 | Kulkarni |
| 8,196,210 B2 | 6/2012 | Sterin |
| 8,321,948 B2 | 11/2012 | Robinson |
| 8,407,669 B2 | 3/2013 | Yee |
| 8,554,750 B2 | 10/2013 | Rangarajan |
| 8,595,647 B2 | 11/2013 | Sabin |
| 8,620,818 B2 | 12/2013 | Hughes |
| 8,646,093 B2 | 2/2014 | Myers |
| 8,674,992 B2 | 3/2014 | Poston |
| 8,725,647 B2 | 5/2014 | Disciascio |
| 9,053,460 B2 | 6/2015 | Gilbert |
| 9,098,555 B2 | 8/2015 | Bjork |
| 10,027,689 B1* | 7/2018 | Rathor ................ H04L 63/1416 |
| 10,079,730 B2 | 9/2018 | Subramanian |
| 10,530,795 B2 | 1/2020 | Pande |
| 10,673,963 B1 | 6/2020 | Feiguine |
| 10,749,943 B1 | 8/2020 | Feiguine |
| 10,771,344 B2 | 9/2020 | Bitterfeld |
| 10,824,650 B2 | 11/2020 | Bar Oz |
| 10,944,654 B2 | 3/2021 | Rimar |
| 10,999,152 B1 | 5/2021 | Bar Oz |
| 11,089,115 B2 | 8/2021 | Garty |
| 11,095,506 B1 | 8/2021 | Erblat |
| 11,226,858 B1 | 1/2022 | Srivastava |
| 11,275,580 B2 | 3/2022 | Tamir |
| 11,277,475 B1 | 3/2022 | Tal |
| 11,281,442 B1 | 3/2022 | Tal |
| 11,296,922 B2 | 4/2022 | Leibkowiz |
| 11,301,503 B2 | 4/2022 | Burli |
| 11,379,089 B2 | 7/2022 | Goswami |
| 11,451,573 B2 | 9/2022 | Waplington |
| 11,470,107 B2 | 10/2022 | Waplington |
| 2002/0116340 A1 | 8/2002 | Hellberg |
| 2002/0133584 A1 | 9/2002 | Greuel |
| 2002/0158969 A1 | 10/2002 | Gupta |
| 2003/0118087 A1 | 6/2003 | Goldthwaite |
| 2003/0200293 A1 | 10/2003 | Fearn |
| 2005/0015217 A1 | 1/2005 | Weidl |
| 2005/0091356 A1 | 4/2005 | Izzo |
| 2006/0026453 A1 | 2/2006 | Frost |
| 2006/0095461 A1 | 5/2006 | Raymond |
| 2006/0179058 A1 | 8/2006 | Bram |
| 2006/0293942 A1 | 12/2006 | Chaddha |
| 2007/0033279 A1 | 2/2007 | Battat |
| 2007/0188494 A1 | 8/2007 | Agutter |
| 2007/0288389 A1 | 12/2007 | Vaughan |
| 2008/0040088 A1 | 2/2008 | Vankov |
| 2008/0133289 A1 | 6/2008 | Armour |
| 2008/0148253 A1 | 6/2008 | Badwe |
| 2008/0319779 A1 | 12/2008 | Hughes |
| 2009/0088875 A1 | 4/2009 | Baier |
| 2009/0228984 A1 | 9/2009 | Sterin |
| 2010/0110932 A1 | 5/2010 | Doran |
| 2010/0146325 A1 | 6/2010 | John |
| 2010/0166384 A1* | 7/2010 | Adimatyam ....... H04N 21/4425 725/39 |
| 2010/0211826 A1* | 8/2010 | Villella ................ G06F 11/3476 714/39 |
| 2011/0131453 A1* | 6/2011 | Fernandess ........... G06F 11/079 714/E11.002 |
| 2012/0016706 A1 | 1/2012 | Pargaonkar |
| 2012/0042216 A1* | 2/2012 | Blubaugh ............ H04L 67/1097 714/48 |

(56) References Cited

U.S. PATENT DOCUMENTS

| | | | | |
|---|---|---|---|---|
| 2013/0238925 | A1* | 9/2013 | Gerhart | G06F 16/9032 |
| | | | | 707/769 |
| 2014/0053025 | A1* | 2/2014 | Marvasti | G06F 11/0754 |
| | | | | 714/37 |
| 2015/0089309 | A1* | 3/2015 | Fu | G06F 11/0724 |
| | | | | 714/57 |
| 2016/0092338 | A1* | 3/2016 | Henley | G06F 11/0769 |
| | | | | 717/125 |
| 2016/0292592 | A1* | 10/2016 | Patthak | G06F 3/04842 |
| 2018/0107920 | A1 | 4/2018 | Jayaraman | |
| 2018/0123940 | A1 | 5/2018 | Rimar | |
| 2018/0173217 | A1* | 6/2018 | Spiro | G05B 23/024 |
| 2019/0104398 | A1 | 4/2019 | Owen | |
| 2019/0155682 | A1 | 5/2019 | Sinha | |
| 2019/0266506 | A1* | 8/2019 | Feldman | G06N 20/00 |
| 2020/0012918 | A1* | 1/2020 | Malhotra | G06N 3/0455 |
| 2020/0050689 | A1 | 2/2020 | Tal | |
| 2020/0204443 | A1 | 6/2020 | Bar Oz | |
| 2020/0272923 | A1 | 8/2020 | Banerjee | |
| 2020/0341882 | A1* | 10/2020 | Entrekin | G06F 11/3438 |
| 2020/0409780 | A1* | 12/2020 | Balasubramanian | |
| | | | | G06F 9/3838 |
| 2021/0182387 | A1* | 6/2021 | Zhu | G06F 21/52 |
| 2021/0194764 | A1 | 6/2021 | Badyan | |
| 2021/0342209 | A1 | 11/2021 | Kishore | |
| 2022/0012272 | A1 | 1/2022 | Burli | |
| 2022/0029886 | A1 | 1/2022 | Hameiri | |
| 2022/0179763 | A1* | 6/2022 | Chan | G06F 11/3006 |

FOREIGN PATENT DOCUMENTS

| | | |
|---|---|---|
| WO | 9934285 W | 7/1999 |
| WO | 0052559 W | 9/2000 |
| WO | 0179970 W | 10/2001 |

* cited by examiner

| | |
|---|---|
| 610 INCIDENT IDENTIFIER | IPT0010051 |
| 612 SHORT DESCRIPTION | UNEXPECTED PROGRAM DETECTED |
| 614 DETAILED DESCRIPTION | UNEXPECTED PROGRAM DETECTED |
| 616 INCIDENT ENTITY | XYZ SOLUTIONS |
| 618 INCIDENT RISK | SECURITY ISSUE IN OPERATING SYSTEM |
| 620 INCIDENT RECOMMENDATION | UPGRADE OPERATING SYSTEM VERSION |
| 622 INCIDENT PRIORITY | 1 - CRITICAL |
| 624 PARENT INCIDENT LOG | |
| 626 INCIDENT ASSIGNEE | JOHN DOE |
| 628 INCIDENT STATE | RESPOND |
| 630 INCIDENT TYPE | SECURITY ISSUE |
| 632 INCIDENT LOCATION | AMERICAS |

FIG 6A

| 650 | | |
|---|---|---|
| 652 | INCIDENT SOLUTION IDENTIFIER | RTSK0001046 |
| 654 | SHORT DESCRIPTION | UPGRADE OPERATING SYSTEM VERSION |
| 656 | DETAILED DESCRIPTION | MAKE BACKUPS OF FILES, CHECK OPERATING SYSTEM VERSION, IF THE LATEST VERSION IS NOT INSTALLED, INSTALL LATEST VERSION OF OPERATING SYSTEM |
| 658 | INCIDENT IDENTIFIER | IPT0010051 |
| 660 | PRIORITY | 1 - CRITICAL |
| 662 | DATE CREATED | NOVEMBER 11, 2020 |
| 664 | DATE UPDATED | NOVEMBER 15, 2020 |
| 666 | PLANNED START DATE | NOVEMBER 25, 2020 |

FIG 6B

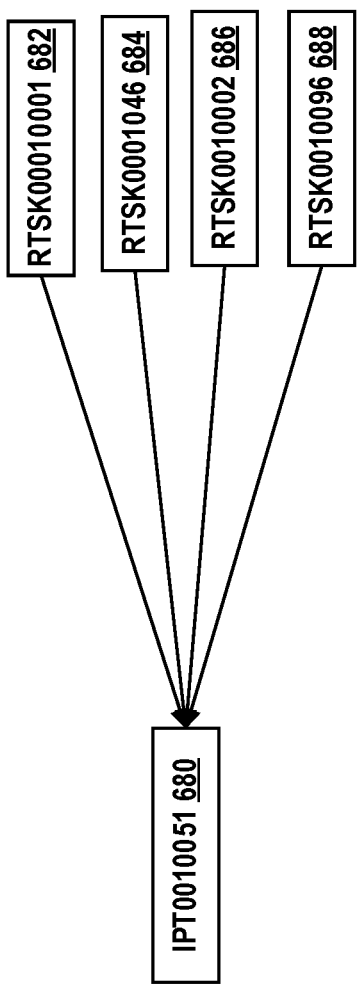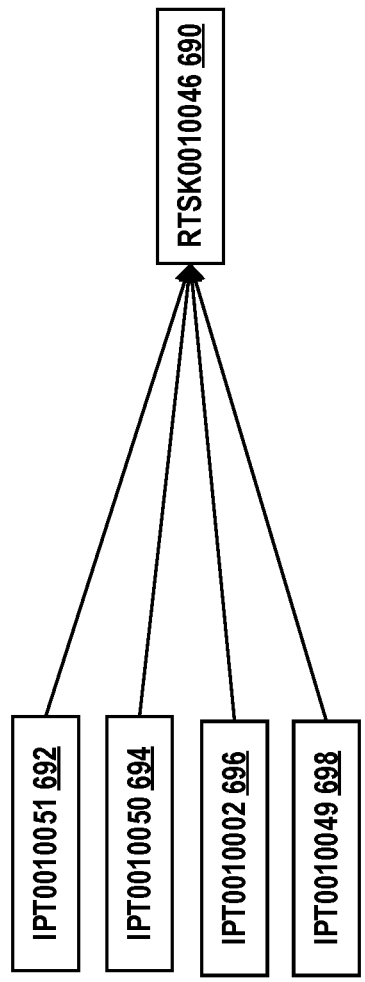

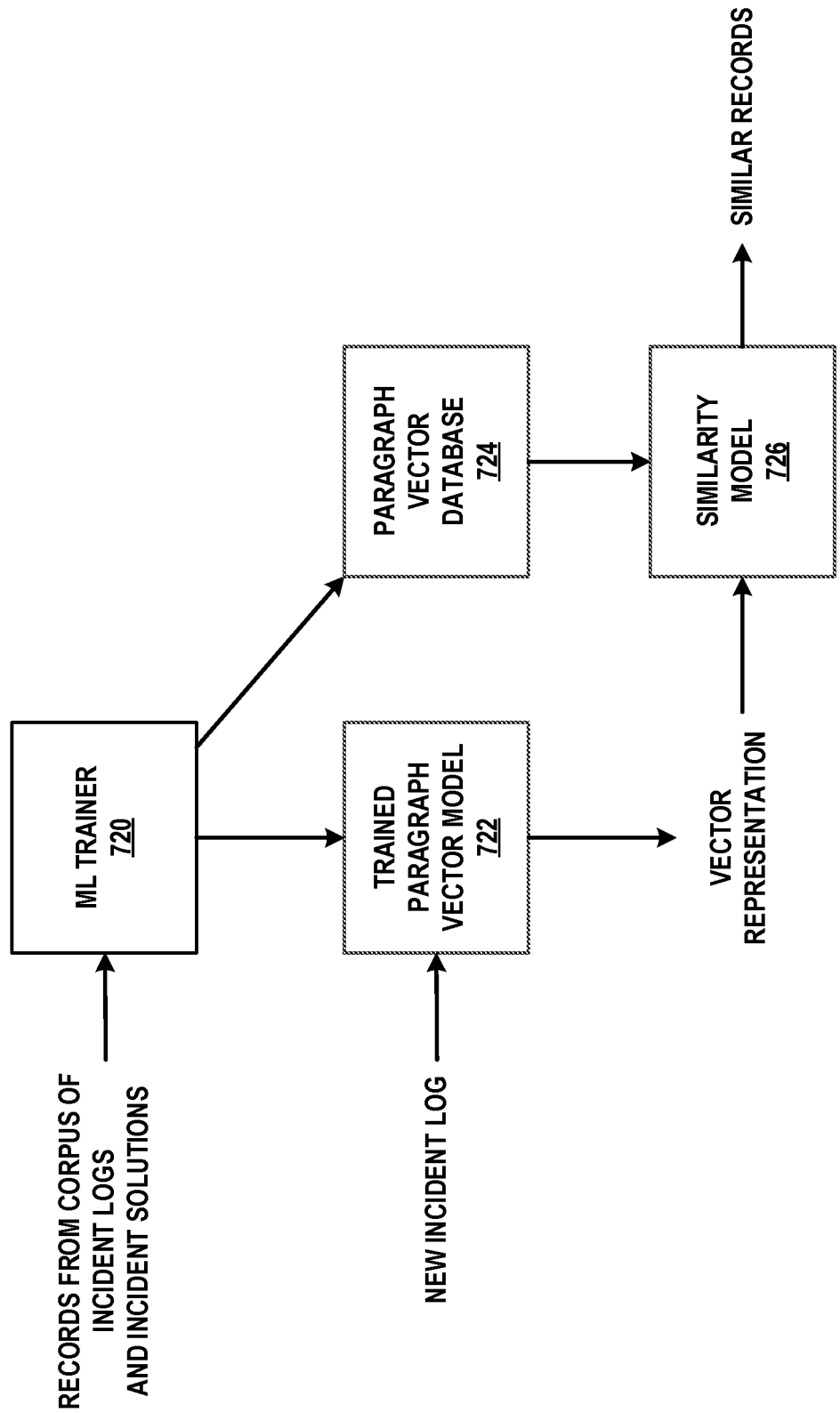

INCIDENT IPT0010051

| | |
|---|---|
| NUMBER | IPT0010051 |
| ASSIGNMENT GROUP | |
| | STATE: RESPOND |
| | GROUP INCIDENT |
| SHORT DESCRIPTION | UNEXPECTED PROGRAM DETECTED |
| DETAILED DESCRIPTION | UNEXPECTED PROGRAM DETECTED |
| RISK | SECURITY ISSUE IN |
| ENTITY | XYZ SOLUTIONS |
| RECOMMENDATION | UPGRADE OPERATING SYSTEM VERSION |

UPDATE  DELETE

← INCIDENT IPT0010051

UPDATE  DELETE

922 → SIMILAR INCIDENT SUGGESTIONS                                        ✕

| 924 | SIMILAR INCIDENT 926 | SHORT DESCRIPTION 928 | CONFIDENCE SCORE 930 |
|---|---|---|---|
| ✓ | IPT0010002 | UNEXPECTED PROGRAM DETECTED | 59.64 |
| ☐ | IPT0010050 | PROGRAM ISSUES RUNNING | 58.64 |
| ☐ | IPT0010088 | APPLICATION FREEZING UPON OPEN | 57.10 |
| ☐ | IPT0010049 | APPLICATION DOES NOT OPEN | 56.68 |
| ☐ | IPT0010096 | UNEXPECTED APPLICATION OPEN | 51.17 |
| ☐ | IPT0020101 | APPLICATION CLOSING UNEXPECTEDL | 43.28 |

932  934

CANCEL    GROUP

FIG. 9B

MACHINE-LEARNING BASED SIMILARITY ENGINE

CROSS REFERENCE TO RELATED APPLICATIONS

This application is a continuation of U.S. patent application Ser. No. 18/120,011, filed on Mar. 10, 2023, the entirety of which is hereby incorporated by reference.

U.S. patent application Ser. No. 18/120,011 is a continuation of U.S. patent application Ser. No. 17/142,769, filed on Jan. 6, 2021, the entirety of which is hereby incorporated by reference.

BACKGROUND

With the advancement of new data storage solutions, large quantities of data are being preserved for enterprises and other entities. This data may be used to document events, detail historical operations, record user habits, and log other relevant and potentially useful information related to the usage of computing devices within an enterprise or other operations of the enterprise. Collection of the data may be automatic through the use of one or more computing devices (e.g., recording application or machine usage data), or manual through user entry (e.g., accumulating incident logs of product related issues). In the case of both automatically-recorded and manually-entered data, the terminology across entries may vary based on the particular user entering the data and accordingly, the data may be difficult to organize and retrieve from a database in a systematic and useful fashion. Further, due to the large quantity of data entries, the lack of systematic organization may result in duplicate entries, facilitating inefficiency when determining actionable events based on these entries and rendering their recording and storage of limited utility.

SUMMARY

Accordingly, the embodiments herein address these and potentially other challenges by introducing a natural language processing approach for organizing and suggesting actionable events from data entries, notably data entries relating to incident logs. The incident logs may record technology-related issues as well as other events for which an actionable resolution is desirable. Each incident log may have multiple corresponding descriptors about the incident and the entity or enterprise relating to the incident. Some incident logs may have relationships to other incident logs, well as relationships to one or more incident solutions. The incident solutions may be steps that were taken to resolve the corresponding incidents.

The descriptors of an incident log, relationships to other incident logs, and incident solutions may serve as inputs to train and/or validate a machine learning (ML) model. Outputs of the trained ML model may include respective vector representations of the incident logs. The ML model and the outputs may be stored in a server or computing device. This ML model may be used to facilitate the grouping of similar incident logs, the suggestion of similar incident logs, and/or the suggestion of one or more actions based on the one or more historical actions from incident solutions.

In an example embodiment, a user may create a new incident log, perhaps relating to a software-related issue, the descriptors of which may serve as an input to the ML model. The output of the ML model may include a vector representation the new incident log, which may be compared with the previously-stored vector representations of the historical incident logs used to train the model or for which corresponding vector representations exist. The comparison may be made by way of calculating similarities between the vector representation of the new incident log and each of the historical incident logs. Based on the similarity calculations, the similarities between the new incident log and each of the historical incident logs may be quantified with respective confidence measurements. Based on the confidence measurements, the new incident log may be clustered with similar incident logs, or may be otherwise associated with similar incident logs.

The most similar of these incident logs may be presented to the user for reference or otherwise linked in some fashion to the new incident log. Additionally or alternatively, actionable events based on historical incident solutions taken from these similar incident logs may be recommended. A user may be subsequently prompted to select one or more of these actionable events for copying into or associating with the new incident log. In this manner, the user may be automatically provided with possible solutions for the issue underlying the new incident log based on historical context.

In various embodiments, the incident logs and incident solutions may be related to more than just technological issues. They may, for example, involve risk management issues, accounting issues, human resources issues, and so on. Thus, an incident log as described herein may represent a risk (technological or otherwise) to an enterprise, and a corresponding incident solution may represent a way to resolve or mitigate that risk.

Further, the selection may then be used in future implementations as training data for the ML model. Accordingly, the accuracy of the ML model may be improved based on new incident logs and the corresponding user inputs.

Accordingly, a first example embodiment may involve persistent storage containing a plurality of incident logs, wherein mappings between the incident logs and vector representations thereof were generated by a ML model based on respective values in a pre-determined set of fields in the incident logs. The first example embodiment may further involve one or more processors configured to: receive, from a client device, a classification request corresponding to an additional incident log; responsive to the classification request, transmit, to the ML model, additional values from the pre-determined set of fields as appearing in the additional incident log, wherein reception of the additional values causes the ML model to generate an additional vector representation of the additional incident log; obtain confidence measurements respectively representing similarities between the additional vector representation and each of the vector representations corresponding to the incident logs; determine, based on the confidence measurements, a set of one or more incident logs that are semantically relevant to the additional incident log; and transmit, to the client device, representations of the one or more incident logs and their corresponding confidence measurements.

A second example embodiment may involve receiving, from a client device, a classification request corresponding to an additional incident log, wherein persistent storage contains a plurality of incident logs, wherein mappings between the incident logs and vector representations thereof were generated by an ML model based on respective values in a pre-determined set of fields in the incident logs. The second example embodiment may also involve responsive to the classification request, transmitting, to the ML model, additional values from the pre-determined set of fields as appearing in the additional incident log, wherein reception of the additional values causes the ML model to generate an additional vector representation of the additional incident log. The second example embodiment may further involve obtaining confidence measurements respectively representing similarities between the additional vector representation and each of the vector representations corresponding to the incident logs. The second example embodiment may also involve determining, based on the confidence measurements, a set of one or more incident logs that are semantically relevant to the additional incident log. The second example embodiment may additionally involve transmitting, to the client device, representations of the one or more incident logs and their corresponding confidence measurements.

In a third example embodiment, an article of manufacture may include a non-transitory computer-readable medium, having stored thereon program instructions that, upon execution by a computing system, cause the computing system to perform operations in accordance with the first example embodiment.

In a fourth example embodiment, a computing system may include at least one processor, as well as memory and program instructions. The program instructions may be stored in the memory, and upon execution by the at least one processor, cause the computing system to perform operations in accordance with the first example embodiment.

In a fifth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6A depicts an incident log, in accordance with example embodiments.

FIG. 6B depicts an incident solution, in accordance with example embodiments.

FIG. 6C depicts a relationship between incident logs and incident solutions.

FIG. 6D depicts a relationship between incident logs and incident solutions.

FIG. 7B depicts an ML model in a production phase, in accordance with example embodiments.

FIG. 9A depicts a graphical user interface for editing incident logs, in accordance with example embodiments.

FIG. 9B depicts a graphical user interface for suggesting related incident logs, in accordance with example embodiments.

DETAILED DESCRIPTION

Figure 1:
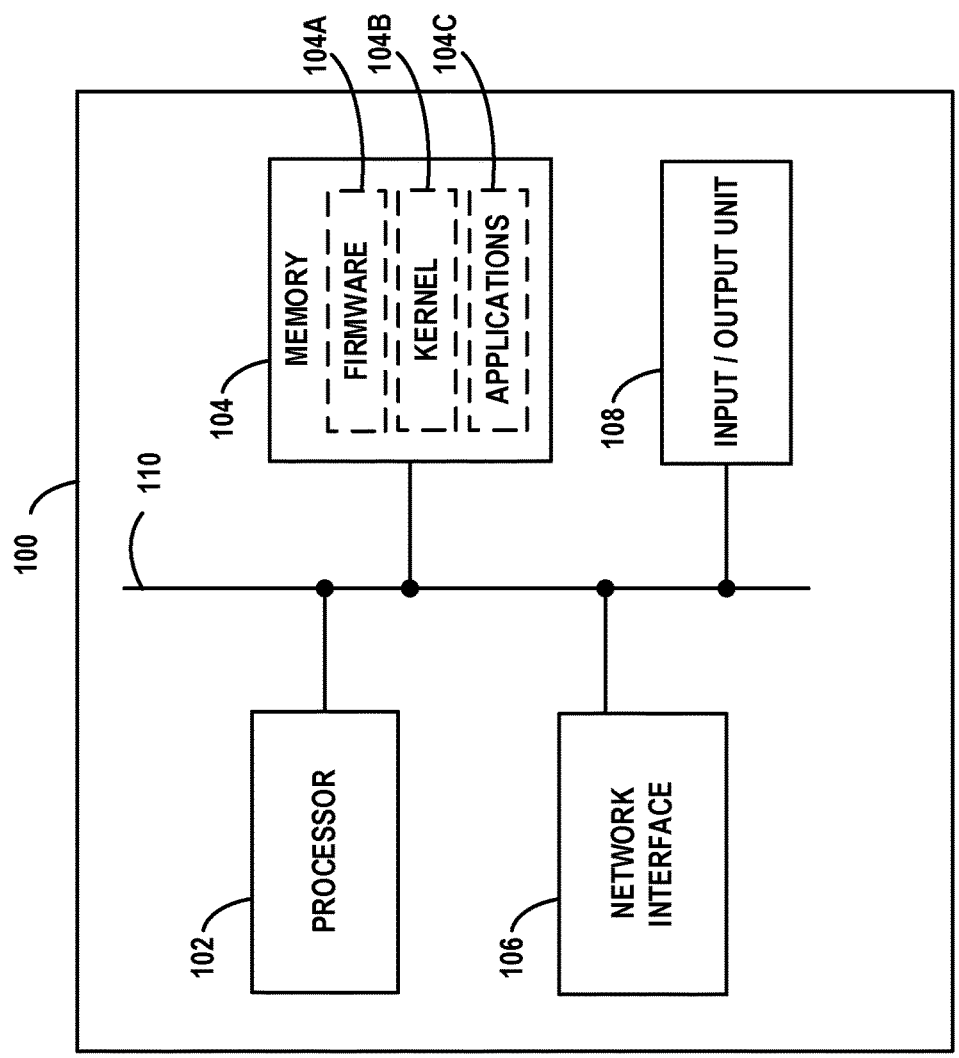
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support graphical user interface tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a graphical user interface of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of predefined functionality that can be added to applications. These features include support for searching, email, templating, workflow design, reporting, analytics, social media, scripting, mobile-friendly output, and customized graphical user interfaces.

Such an aPaaS system may represent a graphical user interface in various ways. For example, a server device of the aPaaS system may generate a representation of a graphical user interface using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a graphical user interface may take other forms, such as an intermediate form (e.g., JAVA® byte-code) that a client device can use to directly generate graphical output therefrom. Other possibilities exist.

Further, user interaction with graphical user interface elements, such as buttons, menus, tabs, sliders, checkboxes, toggles, etc. may be referred to as "selection", "activation", or "actuation" thereof. These terms may be used regardless of whether the graphical user interface elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
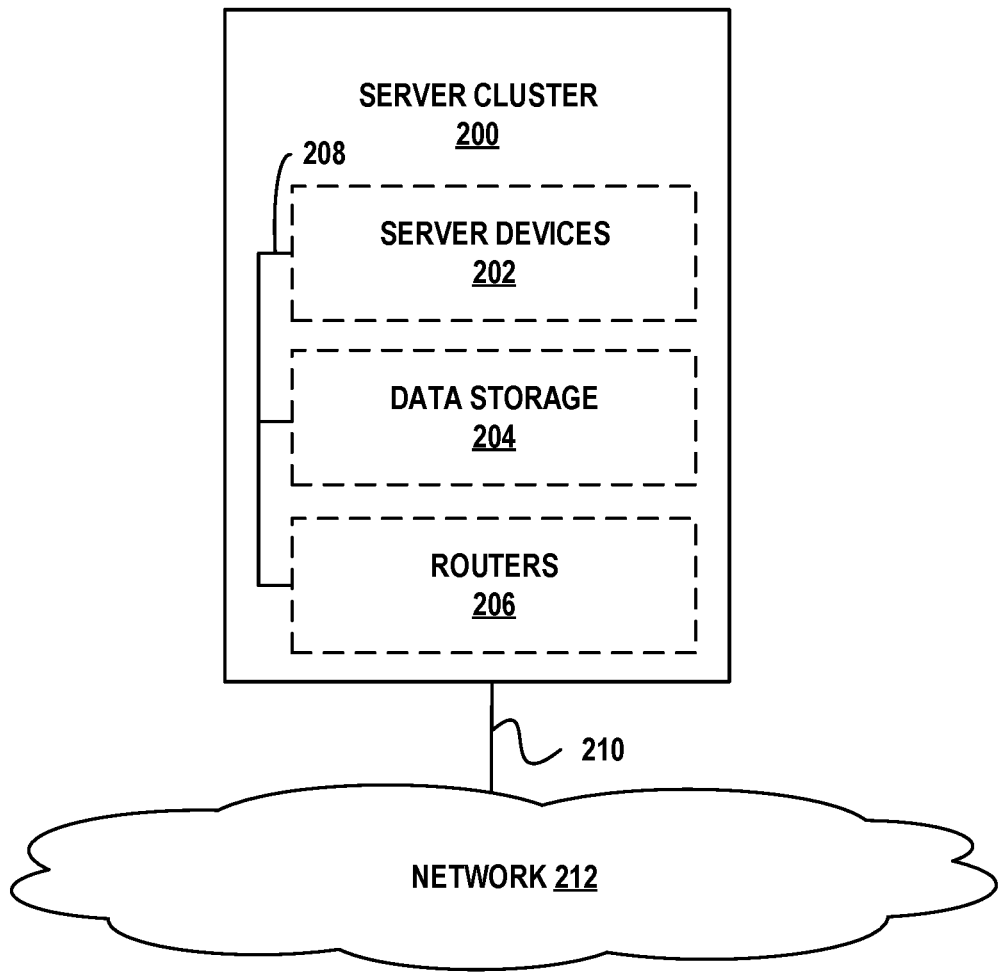
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
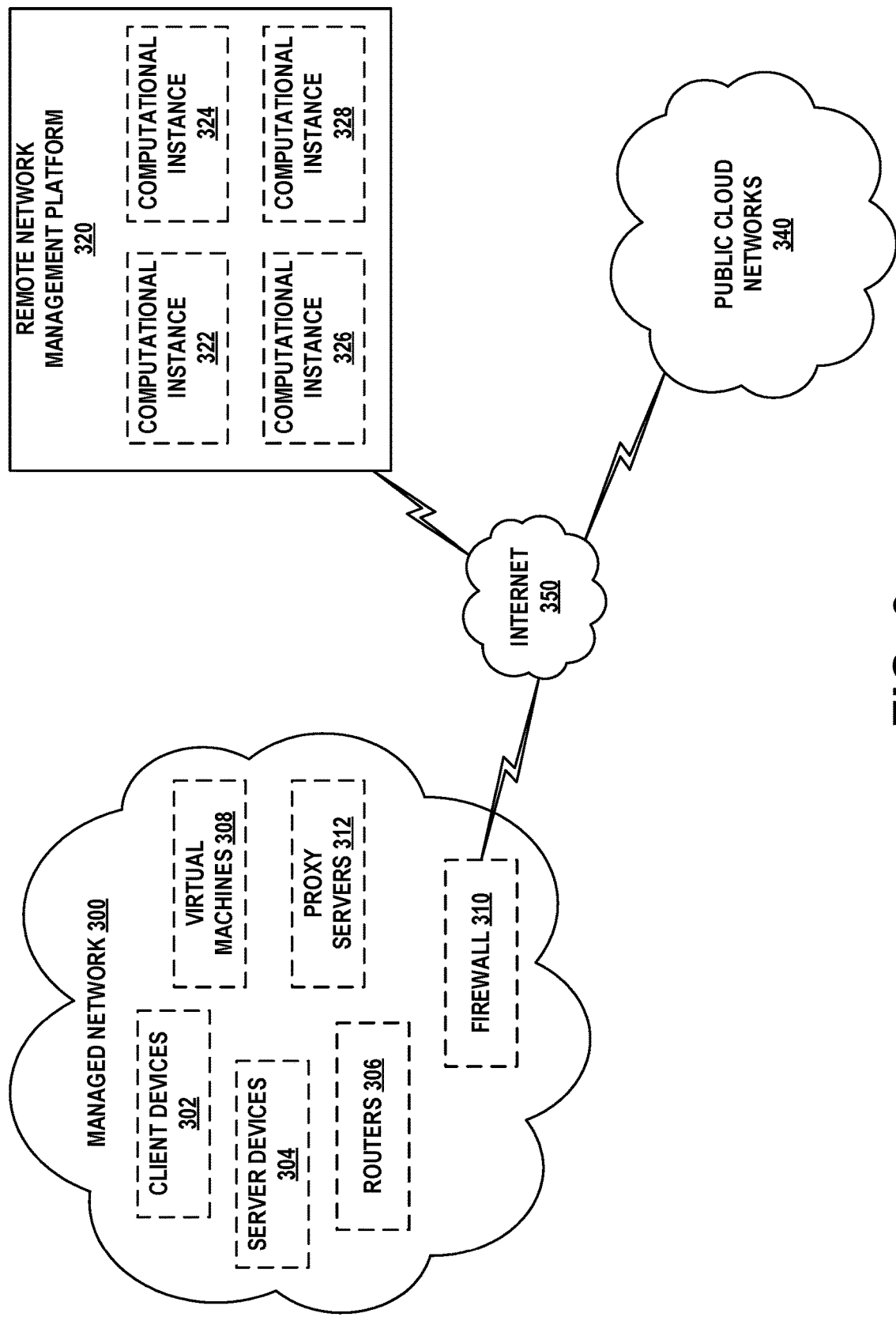
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
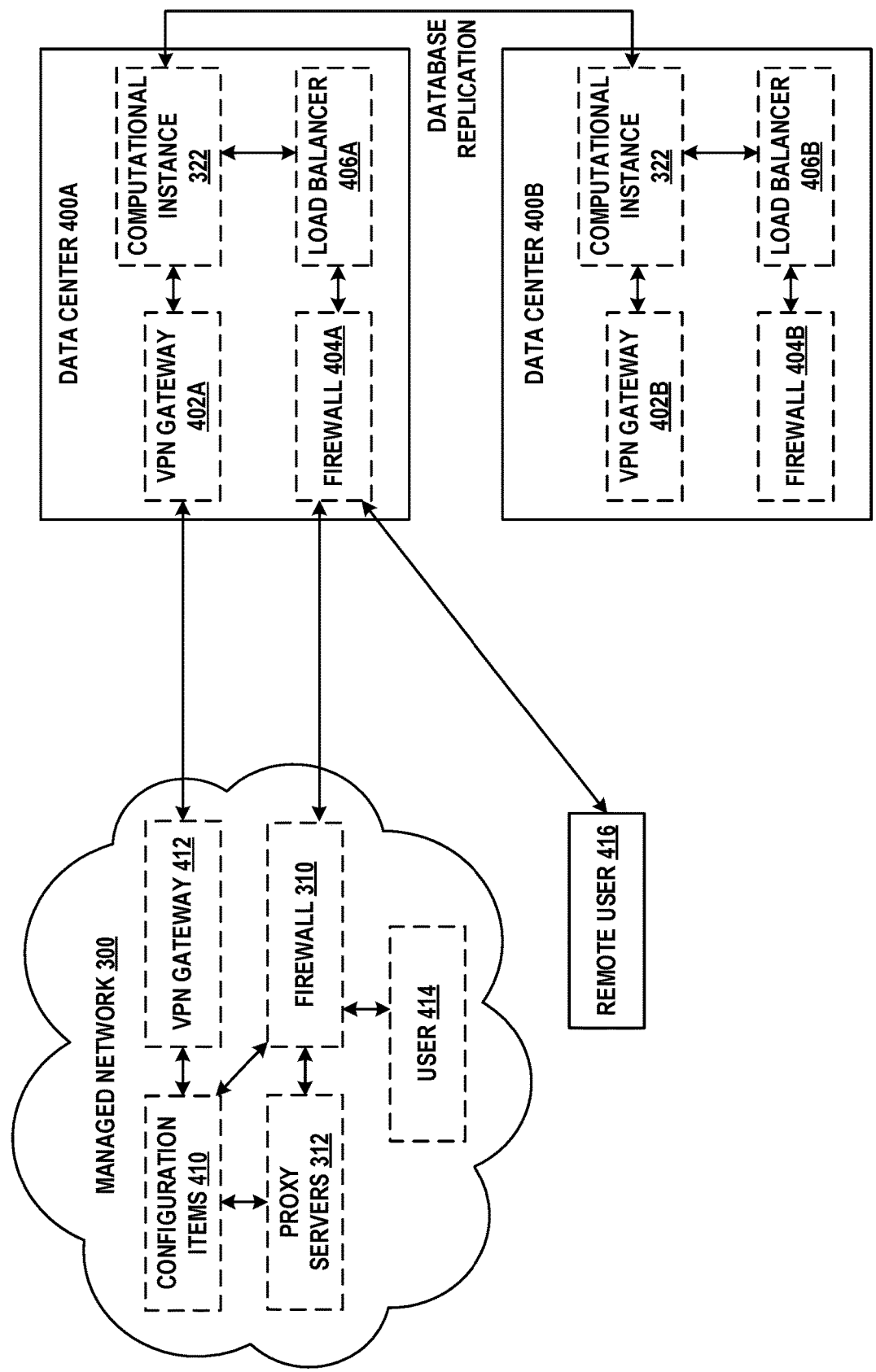
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
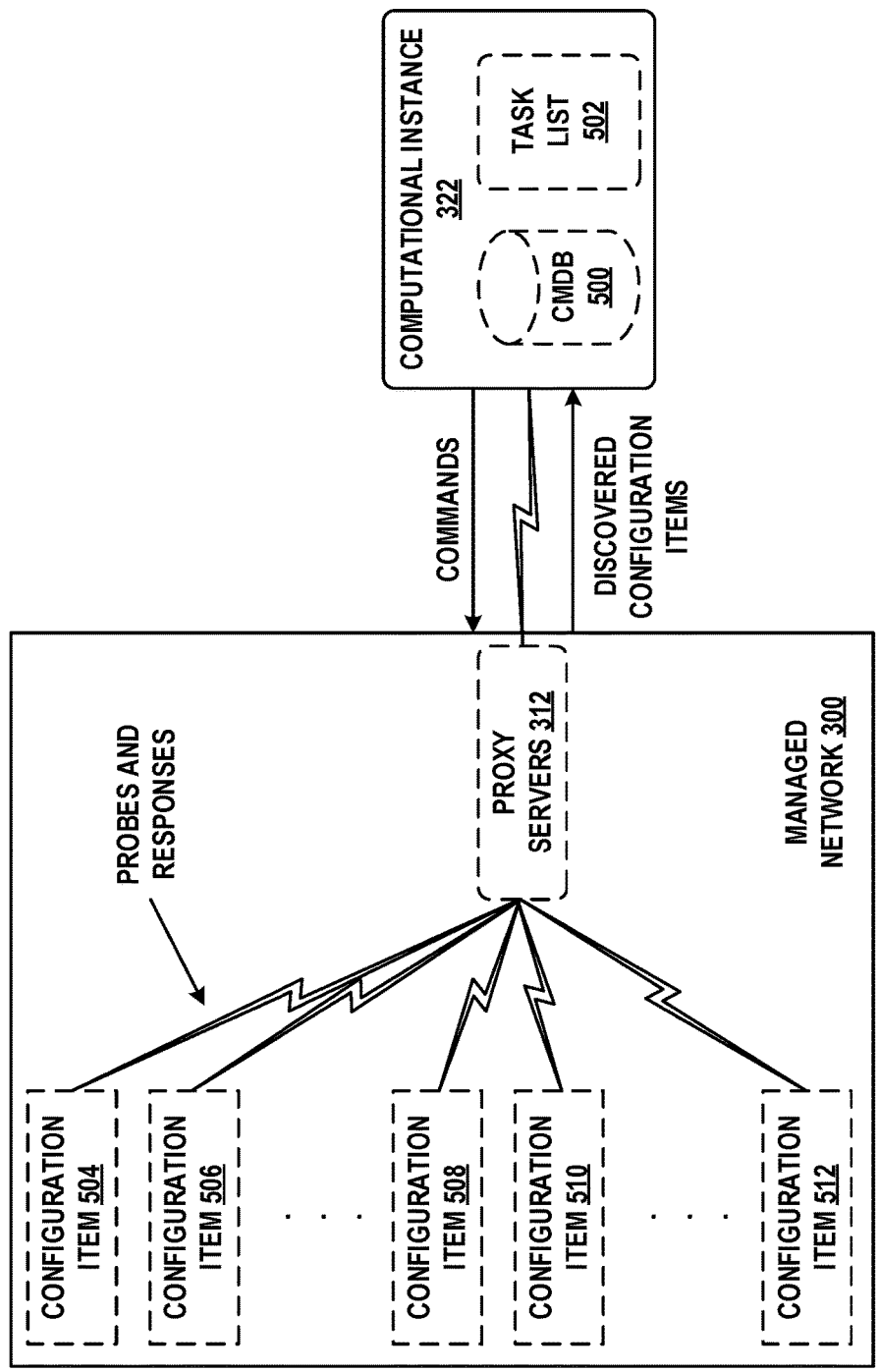
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
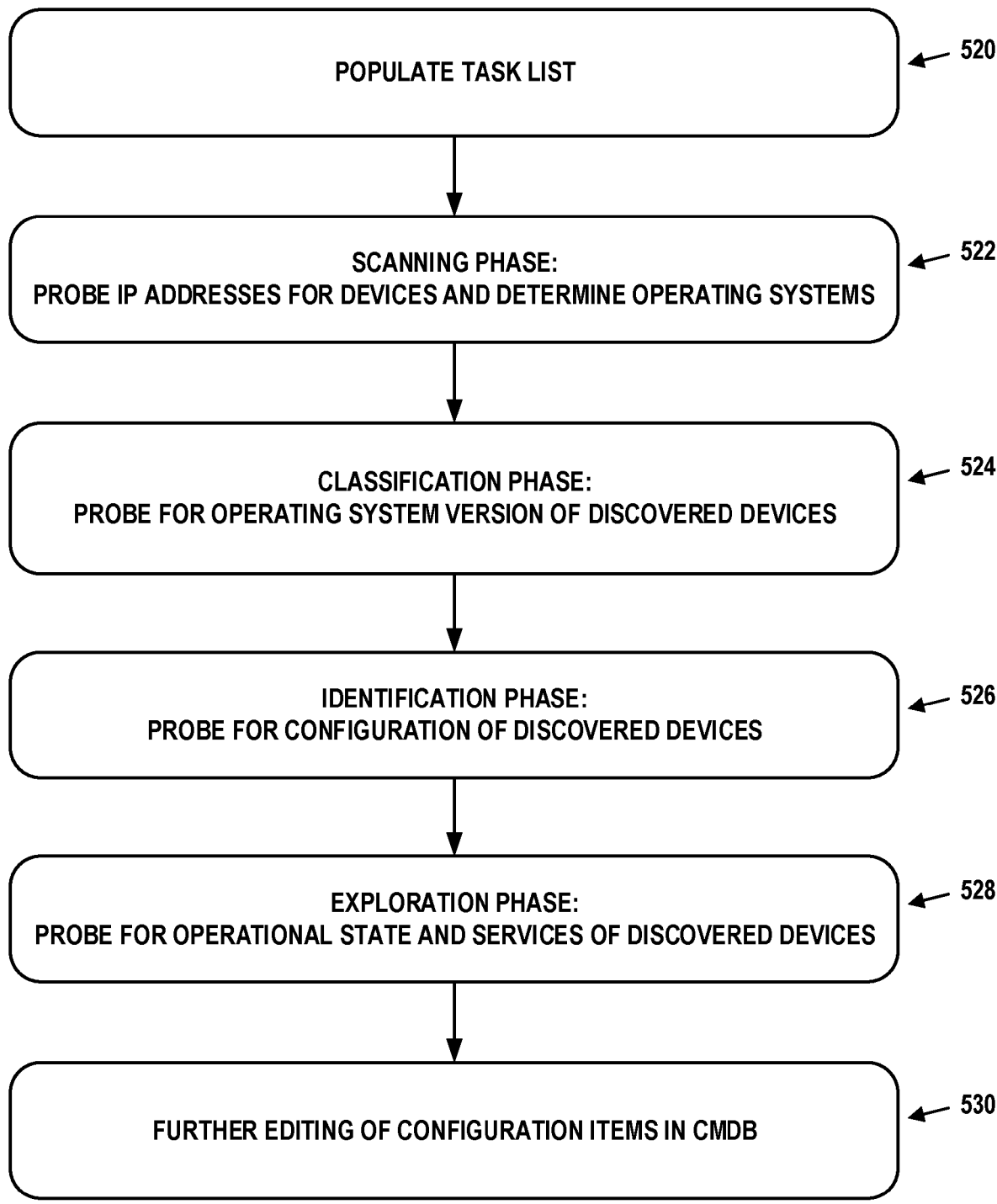
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Incident Logs and Incident Solutions

As mentioned above, enterprises may use software platforms to document events, detail historical operations, record user habits, and log other relevant information, all of which may be stored in a remote or local database, such as a database of computational instance 322. In particular, users and/or members of an enterprise may record incidents relating to equipment, software systems, and other happenings within an enterprise. These incident logs may be used by enterprises to record product-related issues as well as other events for which an actionable resolution is desirable. The collection of the data for these incident logs may be automatic through the use of one or more computing devices and/or manual through user entry. FIG. 6A depicts an example incident log 600 and associated fields.

Incident log 600 may include one or more associated descriptor fields, such as incident identifier field 610, short description field 612, detailed description field 614, incident entity field 616, incident risk field 618, incident recommendation field 620, incident priority field 622, parent incident log field 624, incident assignee field 626, incident state field 628, incident type field 630, and incident location field 632. These fields are depicted for purposes of example and are not meant to be limiting. In addition to and/or in place of these fields, incident log 600 may have one or more other fields that include additional information relating to incident log 600, such as date and/or time created, date and/or time updated, last viewed, etc.

Incident identifier field 610 may include an automatically or manually assigned alphanumeric identifier for incident log 600, in this case IPT0010051. Each incident log may be assigned a different incident identifier.

In general, short description field 612 may contain a summarized description of incident log 600 (e.g., a sentence and/or a phrase) and detailed description field 614 may contain a more through description of incident log 600 (e.g., one or more sentences and/or one or more phrases). However, in some examples, short description field 612 and detailed description field 614 may both contain similar descriptions of incident log 600. For example, short description field 612 and detailed description field 614 both state "unexpected program detected."

Incident log 600 may additionally contain incident entity field 616, which may correspond to the name of an enterprise, in this example XYZ solutions. Incident risk field 618 may correspond to a risk of the incident, in this case "security issue in operating system." Incident recommendation field 620 may include a description of a possible recommendation for the issue, in this case "upgrade operating system version."

Incident log 600 may additionally contain incident priority field 622, parent incident log field 624, incident assignee field 626, incident state field 628, incident type field 630, and incident location field 632. Incident priority field 622 may include a priority rating of incident log 600 and in this case, the priority of incident log 600 is "1—critical." Parent incident log field 624 may be blank or contain an incident identifier or otherwise identify the parent incident log. Incident assignee field 626 may include an identifier corresponding to one or more people responsible for resolving the task, and in this case, incident assignee field 626 contains the name "John Doe." Incident state field 628 may include the status of the incident. Incident type field 630 may include a category of the incident, in this case "respond." Incident location field 632 may include a location of the incident, in this case "Americas."

Each incident log may be associated with one or more incident solutions, which may be assigned to the incident log as an actionable task to be performed in order to resolve the incident. FIG. 6B depicts incident solution 650 and associated fields.

Incident solution 650 may include incident solution identifier field 652, short description field 654, detailed description field 656, incident identifier field 658, incident solution priority field 660, incident solution date created field 662, incident solution date updated field 664, and incident solution planned start date field 666. In addition to and/or in place of these fields, incident solution 650 may have one or more other fields that include additional information relating to incident solution 650.

Incident solution identifier field 652 may include an identifier corresponding to incident solution 650, in this case RTSK0001046. Each incident solution may be automatically or manually assigned a different incident solution identifier field.

Incident solution 650 may additionally include short description field 654 and detailed description field 656. Short description field 654 may contain a summarized description of incident solution 650 (e.g., a sentence and/or a phrase) and detailed description field 656 may contain an additional, in-depth description of incident solution 650 (e.g., one or more sentences and/or one or more phrases). In this case, short description field 654 states "upgrade operating system version" and detailed description field 656 states "make backups of files, check operating version, if the latest version is not installed, install latest version of operating system."

Incident solution 650 may additionally have fields for other information related to the incident solution, for example the priority of the incident solution, the date created, date updated, and planned start date. For example, priority field 660 indicates that the priority of incident solution 650 is "1—critical," date created field 662 indicates that incident solution 650 was created on Nov. 11, 2020, date updated field 664 indicates that incident solution 650 was updated on Nov. 15, 2020, and planned start date field 666 indicates that incident solution 650 was planned to be started on Nov. 25, 2020. These fields may aid in record keeping and project planning.

Further, incident log 650 described by these fields may be carried out to resolve an incident described in a related incident log. For example, incident identifier field 658 of incident solution 650 may include an incident log identifier, in this case IPT0010051. Accordingly, the actionable resolution described in incident solution 650 may be carried out to resolve the incident described by incident log IPT0010051, which in this case, corresponds to incident log 600.

Incident solutions and incident logs may be associated with one other in various ways, two of which are depicted in FIG. 6C and FIG. 6D. In FIG. 6C, incident solutions are associated with incident logs with multiple incident solutions associated with a single incident log. For example, incident solution RTSK0001001 682, incident solution RTSK0001046 684, incident solution RTSK0010002 686, and incident solution RTSK0010096 688 are all associated with incident log IPT0010051 680. These associations may be stored in a database in a fashion similar to incident log 600 and incident solution 650, where incident solution 650 contains an identifier for the associated incident log (e.g., incident identifier field 658), and incident log contains no reference to an associated incident solution.

Alternatively or additionally, as in FIG. 6D, a single incident solution may be associated with multiple incident logs. In FIG. 6D, incident log IPT0010051 692, incident log IPT0010050 694, incident log IPT0010002 696, and incident log IPT0010049 698 are all associated with incident solution RTSK0010046 690. These associations may be stored in a database in a fashion opposite to incident log 600 and incident solution 650 (e.g., incident log 600 contains an identifier for the associated incident solution, and incident solution contains no reference to an associated incident log).

The associations described in FIG. 6C and FIG. 6D are examples and are not meant to be limiting. Other ways of associating incident logs and incident solutions are possible. For example, there may be one-to-one associations between incident logs and incident solutions, multiple incident logs may be associated with multiple incident solutions, and multiple associations may be stored for each incident log and each incident solution.

Incident solutions are usually created manually by an individual to whom an incident log is assigned. Once the incident log is resolved, this individual may describe how the incident log was resolved in the incident solution.

Many of these incident logs and incident solutions may be created and stored in a database (e.g., a CMDB or another database). In a large enterprise, the number of incident logs can easily grow into the thousands or tens of thousands, and the number of incident solutions may also grow accordingly. When a new incident log arrives, an individual assigned to resolve the incident log may benefit from being able to search for and locate similar incident logs that have been resolved in the past. These past resolutions may be helpful to know when resolving the new incident log. But conventional search techniques are largely insufficient these purposes.

For example, simple keyword-based matching of incident logs and incident solutions may take the keywords therein out of context, and may not be able to recognize when the same keyword has multiple meanings or when different keywords have similar meanings. Thus, searches based on keyword matching may be ineffective.

Accordingly, the technical problems relating to the storage and indexing for search of incident logs and incident solutions may benefit from more advanced techniques. Examples of such techniques are provided below.

VI. Example Machine Learning Models

Machine learning (ML) models may utilize the classification, similarity, and/or clustering techniques described below to address the aforementioned problems. But other ML-based techniques may be used. Further, there can be overlap between the functionality of these techniques (e.g., clustering techniques can be used for classification or similarity operations). In many situations, ML-based recommendations can be made from processing text in incident logs and incident solutions, and the embodiments below assume such textual records for purposes of illustration. Nonetheless, other types of data may be used as the basis for developing and using ML models.

ML techniques can include determining word and/or paragraph vectors from samples of text by artificial neural networks (ANNs), other deep learning algorithms, and/or sentiment analysis. These techniques are used to determine a similarity between samples of text, to group multiple samples of text together according to topic or content, to partition a sample of text into discrete internally-related segments, to determine statistical associations between words, or to perform some other language processing task.

A word vector may be determined for each word present in a corpus of textual records such that words having similar meanings (or semantic content) are associated with word vectors that are near each other within a semantically encoded vector space. Such vectors may have dozens, hundreds, or more elements and thus may be an n-space where n is a number of dimensions. These word vectors allow the underlying meaning of words to be compared or otherwise operated on by a computing device (e.g., by determining a distance, a cosine similarity, or some other measure of similarity between the word vectors). Accordingly, the use of word vectors may allow for a significant improvement over simpler word list or word matrix methods. Thus, these models have the benefit of being adapted to the vocabulary, topics, and idiomatic word use common in its intended application.

Additionally or alternatively, the word vectors may be provided as input to an ANN, a support vector machine, a decision tree, or some other machine learning algorithm in order to perform sentiment analysis, to classify or cluster samples of text, to determine a level of similarity between samples of text, or to perform some other language processing task.

Despite the usefulness of word vectors, the complete semantic meaning of a sentence or other passage (e.g., a phrase, several sentences, a paragraph, a text segment within a larger sample of text, or a document) cannot always be captured from the individual word vectors of a sentence (e.g., by applying vector algebra). Word vectors can represent the semantic content of individual words and may be trained using short context windows. Thus, the semantic content of word order and any information outside the short context window is lost when operating based only on word vectors.

Similar to the methods above for learning word vectors, an ANN or other ML models may be trained using a large number of paragraphs in a corpus to determine the contextual meaning of entire paragraphs, sentences, phrases, or other multi-word text samples as well as to determine the meaning of the individual words that make up the paragraphs in the corpus. For example, for each paragraph in a corpus, an ANN can be trained with fixed-length contexts generated from moving a sliding window over the paragraph. Thus, a given paragraph vector is shared across all training contexts created from its source paragraph, but not across training contexts created from other paragraphs.

Word vectors and paragraph vectors are two approaches for training an ANN model to represent the sematic meanings of words. Other techniques, such as bidirectional encoder representations from transformers (BERT), may be used for example. These techniques may be combined with one another or with other techniques.

As an example relevant to the embodiment herein, vector classification models can be trained using word vector or paragraph vector techniques for example. To that point, trained vector classification model 710 in FIG. 7, takes input text from a record (e.g., an incident log and/or an incident solution) and produces a vector representation of the record. This vector representation encodes the sematic meaning of the input text by projecting the input text into n-dimensional space. Similar units of input text will likely have similarly-located vector representations in the n-dimensional space.

Accordingly, similarity model 712 takes an input vector representation of a record and produces zero or more similar records. As noted above, the degree of similarity between two units of input text can be determined by calculating a similarity measurement between their respective vector representations. One such measurement may be based on cosine similarity, which is defined by the following equations:

$$\text{similarity}(\vec{A}, \vec{B}) = \frac{\vec{A} \cdot \vec{B}}{\|\vec{A}\| \|\vec{B}\|}$$

where $\|\vec{A}\| = \sqrt{A_1^2 + A_2^2 + A_3^2 + \ldots + A_n^2}$, and $\|\vec{B}\| = \sqrt{B_1^2 + B_2^2 + B_3^2 + \ldots + B_n^2}$ In these equations, vector A could represent one input vector and vector B could represent another input vector, one of which could be derived from a new incident solution and the other from a previously stored incident solution, for example. Vector A and vector B could both be of dimension n. The similarity calculation may have an output a number between −1 and +1, where the closer this result is to +1, the more similar vectors A and B are to each other.

Thus, the similar records produced by similarity model 712 may be those with vector representations for which the respective cosine similarities with the input vector representation of the record are above a threshold value. Alternatively, the output of similar records may be a certain number of input texts (or identifiers for the certain number of input texts) for which the respective cosine similarities with the input vector representation of the record are the most similar.

The similarity calculations described above may also be used to cluster similar records. Such clustering may be performed to provide a variety of benefits. For example, clustering may be applied to a set of records in order to identify patterns or groups within the set of records that have relevance to the operation of a system or organization. Such groups may facilitate the tracking of ongoing problems (e.g., network outages, user confusion interfacing with a network-based service) by measuring a time-dependence of records assigned to a particular cluster associated with the ongoing problem(s). Such groups may facilitate the early identification of newly-emerging problems by, e.g., identifying similarities between newly-received reports. In some examples, clustering may allow similar records (e.g., reports corresponding to the same clusters) to be manipulated in common, in order to reduce the time required to respond to sets of similar records. For example, records that are related to a network outage and that are assigned to a single cluster could all be resolved in a single operation following resolution of the network outage.

Clustering may be performed in an unsupervised manner in order to generate clusters without the requirement of manually-labeled records, to identify previously unidentified clusters within the records, or to provide some other benefit. A variety of methods and/or ML algorithms could be applied to identify clusters within a set of records and/or to assign records (e.g., newly received or generated records) to already-identified clusters. For example, decision trees, ANNs, k-means, support vector machines, independent component analysis, principal component analysis, or some other method could be trained based on a set of available records in order to generate an ML model to classify the available records and/or to classify records not present in the training set of available records.

For instance, leveraging the vector representations described herein, records can be clustered based on the semantic meanings of their input text. Clusters may be identified, for example, to include vector representations that are within a particular extent of similarity from one another, or not more than a particular Euclidian distance from a centroid in n-space. In these models, some outlying vector representations may remain unclustered.

Once an ML model has been determined, the ML model can be applied to assign additional records to the identified clusters represented by the ML model and/or to assign records to a set of residual records. The ML model could include parameter values, neural network hyperparameters, cluster centroid locations in feature space, cluster boundary locations in feature space, threshold similarity values, or other information used, by the ML model, to determine which cluster to assign a record and/or to determine that the record should not be assigned to a cluster (e.g., should be stored in a set of residual, unassigned records). Such information could define a region, within a feature space, that corresponds to each cluster. That is, the information in the ML model could be such that the ML model assigns a record to a particular cluster if the features of the record correspond to a location, within the feature space, that is inside the defined region for the particular cluster. The defined regions could be closed (being fully enclosed by a boundary) or open (having one or more boundaries but extending infinitely outward in one or more directions in the feature space).

Trained clustering model 714 depicts such an arrangement in general. Particularly, trained clustering model 714 takes an input vector representation of a record and identifies a cluster of similar records (if one exists). To the extent that clusters overlap in the model, more than one cluster can be identified. The cluster or clusters may be determined based on similarity calculations (e.g., cosine similarities) between the input vector representation of the record and other records in the cluster of a centroid of the cluster, for example.

Figure 7A:
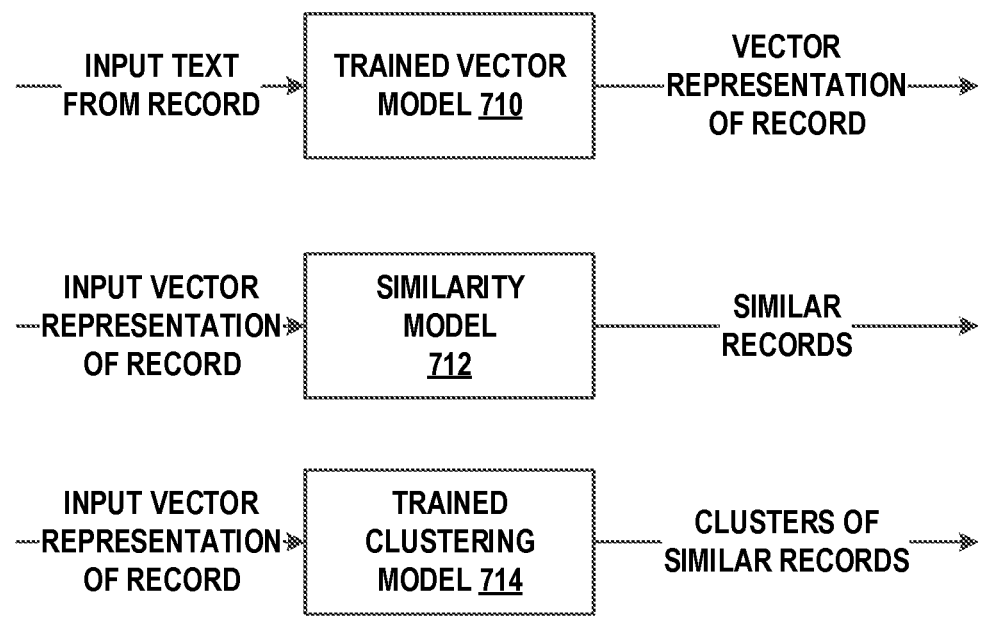
FIG. 7A depicts an ML model in a training phase, in accordance with example embodiments.

FIG. 7B depicts an example of these models in practice. ML trainer 720 takes text fields from a corpus of incident logs and incident solutions, and produces trained paragraph vector model 722. For example, a record within such a corpus may include short description field 612 of incident log 600, detailed description field 614 of incident log 600, incident risk field 618 of incident log 600, and incident recommendation field 620 of incident log 600, as well as short description field 654 of incident solution 650, detailed description field 656 of incident solution 650. Here it is assumed that include log 600 is related to incident solution 650 (e.g., include solution 650 represents a solution to the problem expressed in incident log 600). Any of the above paragraph vector generation techniques could be used.

ML trainer 720 may also produce paragraph vector database 724 as part of the training process. Thus, paragraph vector database 724 may contain one vector representation per record in the corpus (e.g., if the corpus contains k records, there may be k vector representations, one for each record).

Trained paragraph vector model 722 takes a new incident log as input and produces a vector representation of this incident log. This vector representation may be stored in memory and/or provided as input to similarity model 726. In some embodiments, paragraph vector database 724 may be produced by providing records in the corpus trained paragraph vector model 722 and storing their respective vector representations as paragraph vector database 724.

Similarity model 726 may take this vector representation as input, retrieve one or more stored vector representations from paragraph vector database 724, and calculate similarity measures (e.g., cosine similarities) between the vector representation and one or more vector representations retrieved from paragraph vector database 724. These similarity measures may be used to identify records from the corpus that are similar to the record from which the vector representation was derived. For example, if vector representation v1 derived from record r1 is determined to be similar to vector representation v2 derived from record r2, then it can be concluded that there is a semantic similarity between record r1 and record r2.

It should be noted that these inputs, outputs, and models are provided for example and other inputs, outputs, and model architectures may be possible.

VII. Example Architecture

Figure 8:
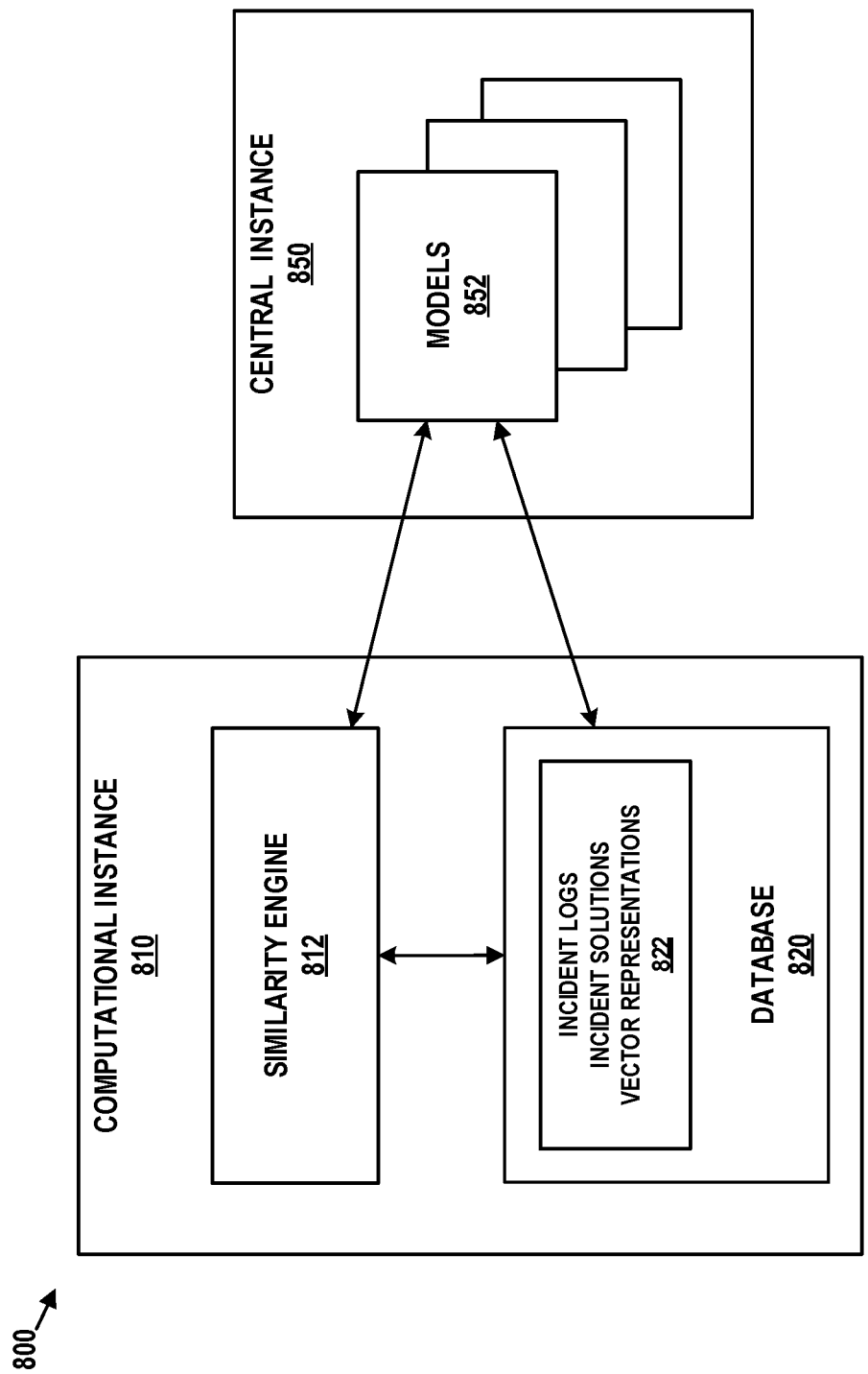
FIG. 8 depicts an architecture for suggesting related incidents and incident solutions, in accordance with example embodiments.

FIG. 8 provides an overview of architecture 800 to facilitate this natural language processing approach. Architecture 800 includes computational instance 810 and central instance 850.

Computational instance 810 involves database 820 and similarity engine 812. Database 820 may include data entries, such as incident log 600 and incident solution 650, among other incident logs and incident solutions. Additionally, database 820 may include vector representations of these incident logs and incident solutions, which may be generated from models 852 in central instance 850, as discussed above. Computational instance 810 may also include similarity engine 812 which may receive information from models 852 of central instance 850, as well as data from database 820. For example, vector representations of database 820 and calculated vector representations of models 852 may be received by similarity engine 812 to determine the similarity measurements, as discussed above.

As noted, central instance 850 includes models 852. These models may be machine learning algorithms and may take representations of incident logs, incident solutions, and vector representations 822 of database 820 as inputs and/or outputs. Central instance 850 may store the architecture of models 852 as well as perhaps the parameters and/or hyperparameters of models 852 that aid in determining the output of models 852 from the inputs of model 852. In some embodiments, similarity engine 812 may be disposed within central instance 850 rather than computational instance 810.

There may be advantages to placing the training and/or execution of models in central instance 850 rather than computational instance 810. Notably, computational instance 810 may be tasked with executing numerous applications for hundreds or thousands of users, and generating data-driven graphical user interfaces for these users. ML models, in particular, can be expensive in terms of computation and storage. Thus, to avoid causing latency for these applications and a lack of responsiveness for their graphical user interfaces, some or all processing of ML models may be placed in central instance 850.

Putting this together, consider the following scenario. A user creates a new incident log, similar to incident log 600, which may be stored among the other incident logs, incident solutions, and vector representations 822 in database 820. Fields from this new incident log may be provided models 852 of central instance 850 and a vector representation may be generated. This vector representation of the new incident log may be compared with the stored vector representations by similarity engine 812 through the use of a similarity calculation, e.g., cosine similarity, to produce a metric upon which the degree of similarity of the new incident logs to each of the stored incident logs can be determined.

Several of the incident logs and their calculated similarities may be displayed to the user, who may select an incident log with which to group the new incident log and/or an incident solution with which to assign the new incident. The user's selection may be stored in database 820 with the new incident log. In further examples, this incident log, the grouping, the assigned incident solution, and other incident logs, groupings, and solutions, may serve as a basis to further train models 852 after a predetermined period of time.

VIII. Example Graphical User Interfaces

As mentioned above, an enterprise may store many incident logs and incident solutions in a database, e.g., database 820. It may be advantageous for the users of the enterprise to view and/or edit the incident logs and incident solutions. Accordingly, a graphical user interface for viewing and/or editing the incident logs, classifying the incident solutions, associating incident logs with incident solutions, and editing the incident solutions may be provided. FIGS. 9A, 9B, 9C, and 9D are examples of graphical user interfaces that could be used for these purposes.

FIG. 9A depicts graphical user interface 900 for adding a new incident log or editing an incident log, e.g., incident log 600. Graphical user interface 900 may be a web based form and may include fields for number, assignment group, short description, detailed description, risk, entity, recommendation, state, group incident, among others. These fields may correspond to those of incident log 600. In particular, graphical user interface 900 may include a button 902, that when actuated, allows the user to select a similar incident for grouping. Thus, actuation of button 902 may causes a process similar to that of FIG. 7B to be carried out for the displayed incident log on an architecture similar to that of FIG. 8. Graphical user interface 900 is provided as an example and other graphical user interfaces for suggesting similar incident logs and suggesting relevant incident solutions are possible.

After actuation of button 902 and after the process shown by FIG. 7B is carried out, a graphical user interface for selecting similar incident logs may be displayed. FIG. 9B depicts graphical user interface 900 modified to facilitate selection of one or more similar incidents for grouping. Graphical user interface 900 includes similar incident suggestions box 922, which may be shown after the user actuates button 902 and similar incidents are identified. Similar incident suggestions box 922 includes a listing of these similar incidents, e.g., incident 932 and incident 934, and identifying information for each incident, e.g. similar incident column 926 and short description column 928. Additionally, similar incident suggestions box 922 may include graphical user interface elements to select similar incidents with which to group the main incident in graphical user interface 900, e.g., the check boxes of column 924, as well as calculated confidence measurements, e.g., column 930.

The calculated confidence measurements in column 930 may be determined based on the similarity calculation described above. Specifically, if the positive results from the cosine similarity measurement may be multiplied by 100 to obtain the confidence score. Other calculations of confidence are also possible.

In some cases, the incidents listed in similar incident suggestions box 922 may be based on the confidence scores. In particular, several of the incidents with the highest confidence scores (e.g., the incidents that are predicted to be most similar to the incident in FIG. 9A) may be displayed in similar incident suggestions box 922.

Further, in graphical user interface 900 and in the process of grouping incident logs, the user may elect to group an incident with another incident in a particular fashion. For example, the incident log may be associated with another incident log that describes a broader incident. This other incident log could be the parent of the incident log in FIG. 9A. Additionally, the incident log may be associated with another incident log that describes a similar incident. These two incident logs may grouped together as a leaf incident.

Figure 9C:
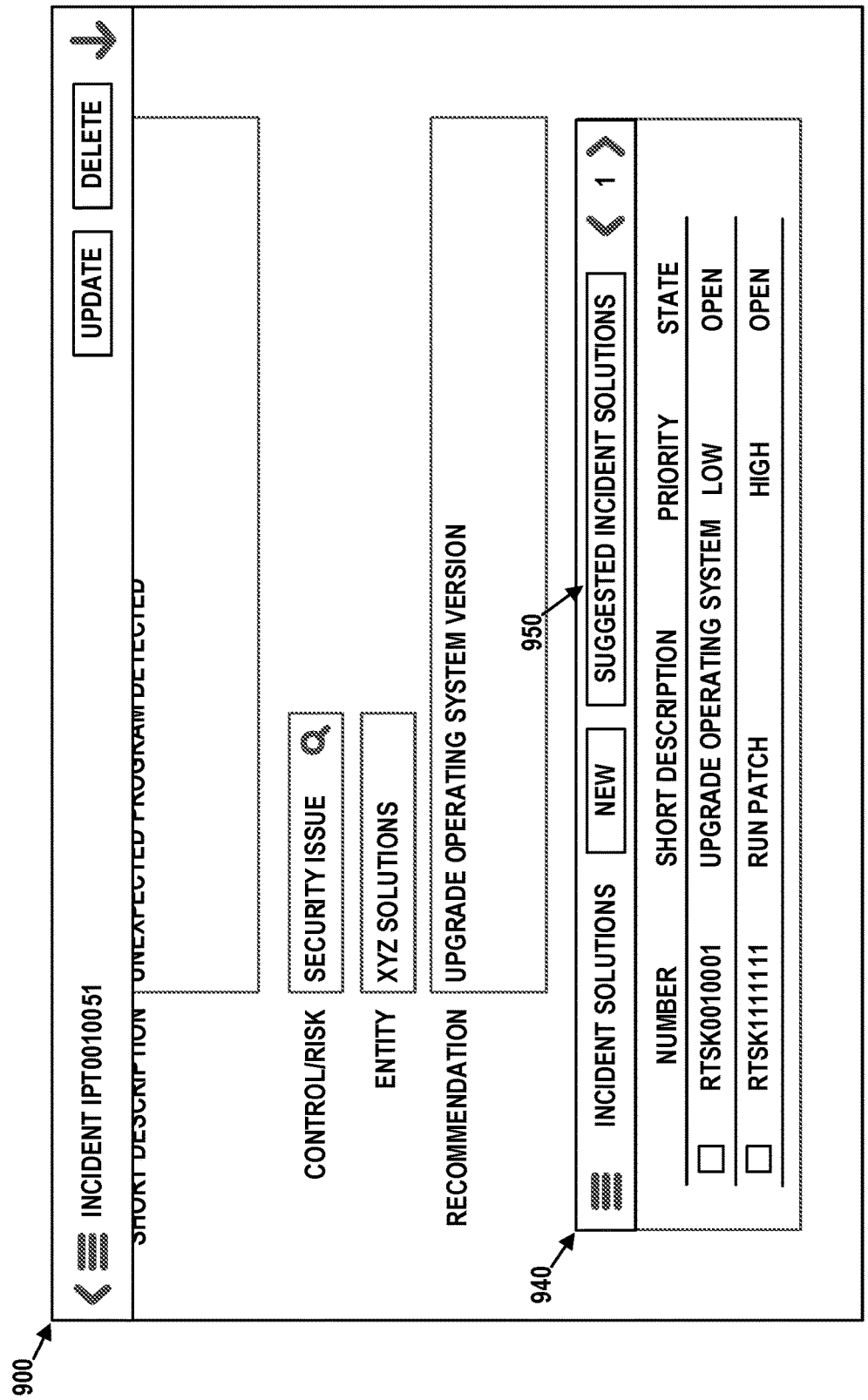
FIG. 9C depicts a graphical user interface for editing incident logs, in accordance with example embodiments.

Scrolling down in the graphical user interface 900 of FIG. 9A, graphical user interface 900 may also have displayed a list of associated incident solutions. FIG. 9C depicts graphical user interface 900 including incident solutions box 940. In incident solutions box 940, a user may manage associated incident solutions, e.g., through editing an incident solution, adding a new incident solution, or selecting a similar incident solution using button 950.

Figure 9D:
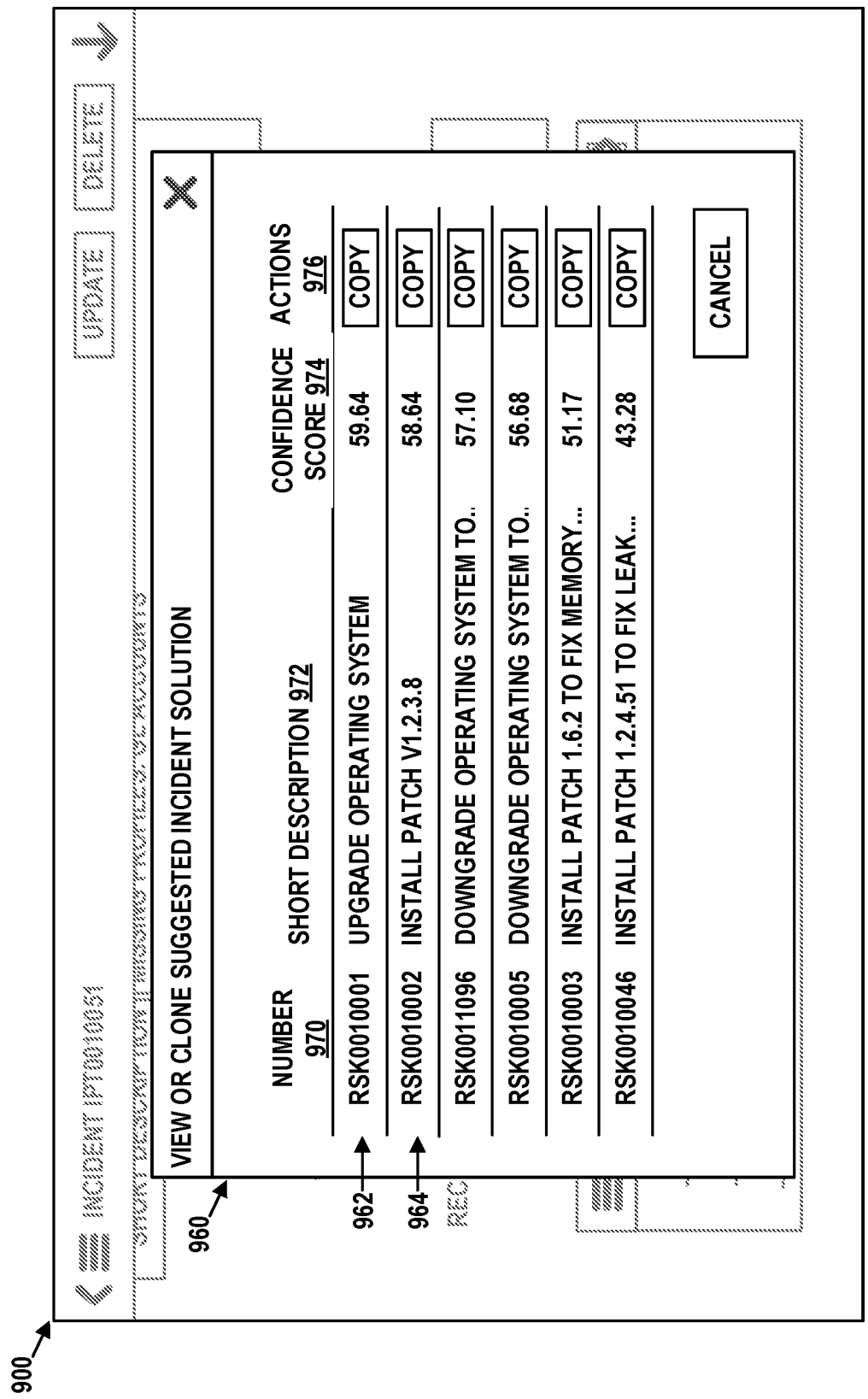
FIG. 9D depicts a graphical user interface for suggesting related incident solutions, in accordance with example embodiments.

In response to actuating button 950, graphical user interface 900 may display a suggested incident solutions box, e.g., suggested incident solution box 960 as in FIG. 9D. Suggested incident solution box 960 may include a list of incident solutions, e.g., incident solution 962 and incident solution 964, and may include identifying information of each incident, e.g., number in column 970 and short description in column 972. Additionally, incident solutions box 960 may include the confidence measurement of each incident, for example, in column 974, and an option to copy a suggested incident solution, for example in column 976. The copied incident solution may then be assigned to the main incident in graphical user interface 900.

As mentioned above, the user selections in FIG. 9B and FIG. 9D may be used to re-train or fine-tune the model at a later time. For example, if a user selects incident 932 in similar incident suggestions box 922, a database may store the selection with perhaps a group identifier and this data may be used the next time the model is re-trained or fine-tuned. In other examples, if a user elects to copy incident solution 962 of incident solution box 960, the new incident solution (likely similar in content to incident solution 962) may be associated with the main incident of graphical user interface 900 and this incident identifier may be used the next time the model is re-trained or fine-tuned.

Such a setup of re-training and fine-tuning a model based on newly collected data may be advantageous in a couple of ways. First, models typically depend on generalizations of training data to produce predictions, and more training data generally results in better predictions since potential irregularities accentuated by small sample size may be less pronounced for a larger sample size. Second, by training with the newly generated data, the model may be maintained to learn about new incidents and their solutions, as well as about new words that may be used by new users.

IX. Example Operations

Figure 10:
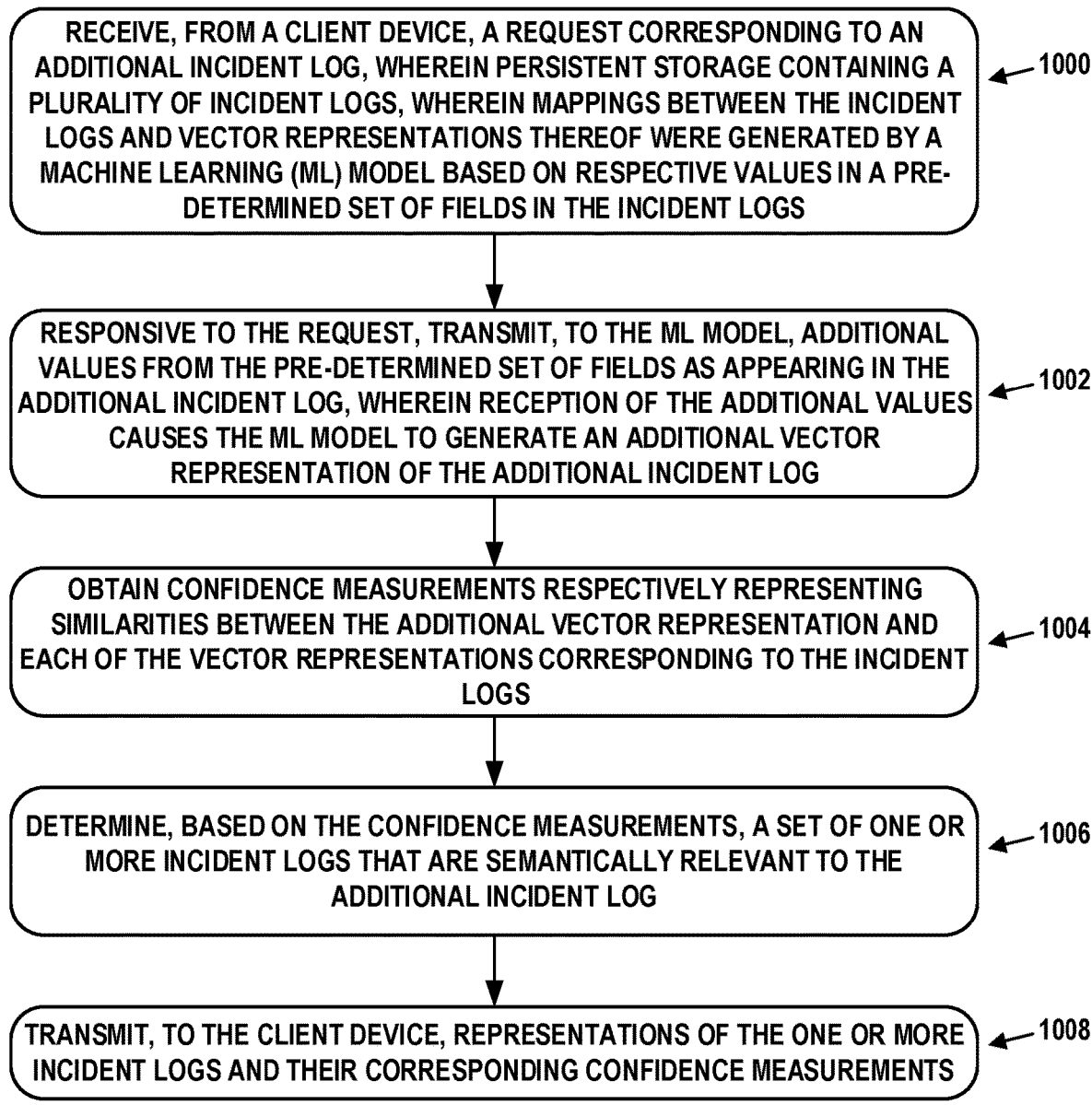
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 may involve receiving, from a client device, a classification request corresponding to an additional incident log, wherein persistent storage contains a plurality of incident logs, wherein mappings between the incident logs and vector representations thereof were generated by an ML model based on respective values in a pre-determined set of fields in the incident logs.

Block 1002 may involve, responsive to the classification request, transmitting, to the ML model, additional values from the pre-determined set of fields as appearing in the additional incident log, wherein reception of the additional values causes the ML model to generate an additional vector representation of the additional incident log.

Block 1004 may involve obtaining confidence measurements respectively representing similarities between the additional vector representation and each of the vector representations corresponding to the incident logs.

Block 1006 may involve determining, based on the confidence measurements, a set of one or more incident logs that are semantically relevant to the additional incident log.

Block 1008 may involve transmitting, to the client device, representations of the one or more incident logs and their corresponding confidence measurements.

Some embodiments may further involve, before receiving the classification request: (i) generate a representation of a graphical user interface, wherein the graphical user interface includes an identifier for the additional incident log, a description of the additional incident log, and an actuatable classification control, and (ii) transmit, to the client device, the representation of the graphical user interface, wherein the actuatable classification control, when actuated by way of the client device, causes transmission of the classification request.

In some embodiments, the transmitting representations of the one or more incident logs and their corresponding confidence measurements comprises generating a representation of a graphical user interface, wherein the graphical user interface includes a list-based view of the one or more incident logs and their corresponding confidence measurements, and wherein the list-based view specifies in line items for each of the one or more incident logs: (i) an identifier, (ii) a description, and (iii) a corresponding confidence measurement; and transmitting, to the client device, the representation of the graphical user interface.

Some embodiments may further involve receiving, from the client device, a selected incident log from the one or more incident logs; and storing, in the persistent storage, an association between the selected incident log and the additional incident log.

In some embodiments, the association is a parent-child relationship or a sibling relationship.

In some embodiments, the persistent storage further includes a plurality of incident solutions, wherein each of the incident solutions includes a further set of fields that define a solution to a problem expressed in one of the incident logs. These embodiments may further involve determining, based on the representations of the one or more incident logs, a set of one or more incident solutions associated with the one or more incident logs.

Some embodiments may further involve generating a representation of a graphical user interface, wherein the graphical user interface includes a list-based view of the representations of the one or more incident solutions, and wherein the list-based view specifies in line items for each of the one or more incident solutions: (i) a identifier, and (ii) a description; and transmit, to the client device, the representation of the graphical user interface.

In some embodiments, the list-based view also specifies corresponding confidence measurements in the line items for each of the one or more incident solutions.

Some embodiments may further involve receiving, from the client device, a selected incident solution from the one or more incident solutions; and storing, in the persistent storage, an association between the selected incident solution and the additional incident log.

In some embodiments, the ML model is based on a word vector model or a paragraph vector model. Training the ML model may involve mapping text within the pre-determined set of fields for each of the incident logs respectively into the vector representations, wherein the vector representations are encoded in an n-dimensional semantic space related to content of the text.

In some embodiments, obtaining confidence measurements comprises: calculating respective cosine similarity measurements between the additional vector representation and each of the vector representations corresponding to the incident logs; and calculating the confidence measurements as multiples of the respective cosine similarity measurements that are greater than zero.

In some embodiments, each of the incident logs in the plurality of incident logs and the additional incident log comprises a description of an incident relating to a managed network.

In some embodiments, the one or more processors are disposed within a computational instance of a remote network management platform, wherein the computational instance is dedicated to a managed network associated with the client device, wherein the ML model is disposed within a central instance of the remote network management platform, and wherein the central instance stores further ML models used by further computational instances of the remote network management platform.

X. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:
   receiving first data indicating a classification request that is directed to a graphical user interface (GUI), wherein the classification request is based on a first incident log;
   generating, via a machine learning model, a first vector representation of the first incident log;
   identifying a second incident log of a plurality of incident logs according to a comparison between the first vector representation and respective vector representations of the plurality of incident logs; and transmitting second data to update the GUI to display a visual representation of the second incident log.

2. The method of claim 1, wherein identifying the second incident log includes comparing the first vector representation with each of the respective vector representations of the plurality of incident logs.

3. The method of claim 1, wherein the first data is received from a client device, and wherein the second data is transmitted to the client device.

4. The method of claim 1, wherein the visual representation of the second incident log is selectable for grouping with a visual representation of the first incident log.

5. The method of claim 4, further comprising:
receiving a selection of the second incident log; and
storing a group association between the first incident log and the second incident log.

6. The method of claim 5, wherein the group association is a parent-child relationship or a sibling relationship.

7. The method of claim 1, wherein identifying the second incident log comprises:
determining, based on similarity values between the first vector representation and the respective vector representations of the plurality of incident logs, the second incident log as being above a threshold similarity with the first incident log.

8. The method of claim 1, wherein the GUI includes an identifier for the first incident log and a description of the first incident log.

9. The method of claim 1, wherein the GUI includes a list-based view of the plurality of incident logs, and wherein the list-based view respectively specifies in line items for each of the plurality of incident logs: (i) an identifier and (ii) a description.

10. The method of claim 1, further comprising:
determining, based on the plurality of incident logs, a set of one or more incident solutions associated with one or more of the plurality of incident logs, wherein each of the incident solutions includes a further set of fields that respectively define a solution to a problem expressed in the one or more of the plurality of incident logs.

11. The method of claim 1, wherein the first vector representation was generated by the machine learning model based on respective values in one or more fields of the first incident log, and wherein a second vector representation was generated by the machine learning model based on respective values in one or more fields of the second incident log.

12. The method of claim 11, wherein the machine learning model is based on a word vector model or a paragraph vector model, and wherein training the machine learning model comprises mapping text within a pre-determined set of fields for a set of training incident logs into an n-dimensional semantic space related to content of the text.

13. A non-transitory computer-readable medium, having stored thereon program instructions that, upon execution by a computing system, cause the computing system to perform operations comprising:
receiving first data indicating a classification request that is directed to a graphical user interface (GUI), wherein the classification request is based on a first incident log;
generating, via a machine learning model, a first vector representation of the first incident log;
identifying a second incident log of a plurality of incident logs according to a comparison between the first vector representation and respective vector representations of the plurality of incident logs; and
transmitting second data to update the GUI to display a visual representation of the second incident log.

14. The non-transitory computer-readable medium of claim 13, wherein the visual representation of the second incident log is selectable for grouping with a visual representation of the first incident log.

15. The non-transitory computer-readable medium of claim 14, the operations further comprising:
receiving a selection of the second incident log; and
storing a group association between the first incident log and the second incident log.

16. The non-transitory computer-readable medium of claim 15, wherein the group association is a parent-child relationship or a sibling relationship.

17. The non-transitory computer-readable medium of claim 13, the operations further comprising:
determining, based on the plurality of incident logs, a set of one or more incident solutions associated with one or more of the plurality of incident logs, wherein each of the incident solutions includes a further set of fields that respectively define a solution to a problem expressed in the one or more of the plurality of incident logs.

18. The non-transitory computer-readable medium of claim 13, wherein the first vector representation was generated by the machine learning model based on respective values in one or more fields of the first incident log, and wherein a second vector representation was generated by the machine learning model based on respective values in one or more fields of the second incident log.

19. The non-transitory computer-readable medium of claim 18, wherein the machine learning model is based on a word vector model or a paragraph vector model, and wherein training the machine learning model comprises mapping text within a pre-determined set of fields for a set of training incident logs into an n-dimensional semantic space related to content of the text.

20. A system comprising:
persistent storage containing a plurality of incident logs; and
one or more processors configured to:
receive first data indicating a classification request that is directed to a graphical user interface (GUI), wherein the classification request is based on a first incident log;
generate, via a machine learning model, a first vector representation of the first incident log;
identify a second incident log of the plurality of incident logs according to a comparison between the first vector representation and respective vector representations of the plurality of incident logs; and
transmit second data to update the GUI to display a visual representation of the second incident log.

* * * * *